(No Model.)
T. M. NESBITT.
GRAIN TOLLER.
No. 413,084. Patented Oct. 15, 1889.
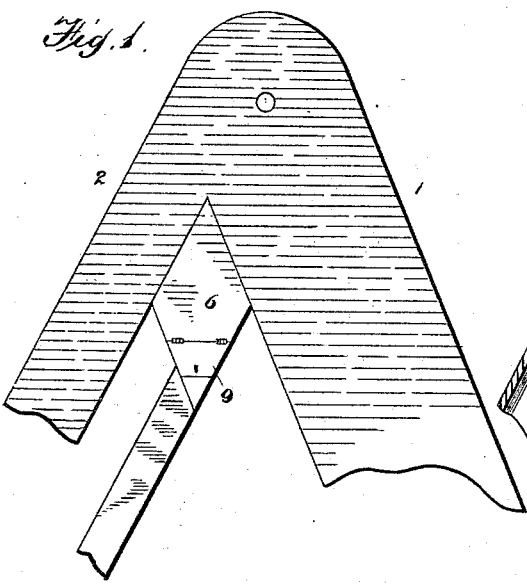
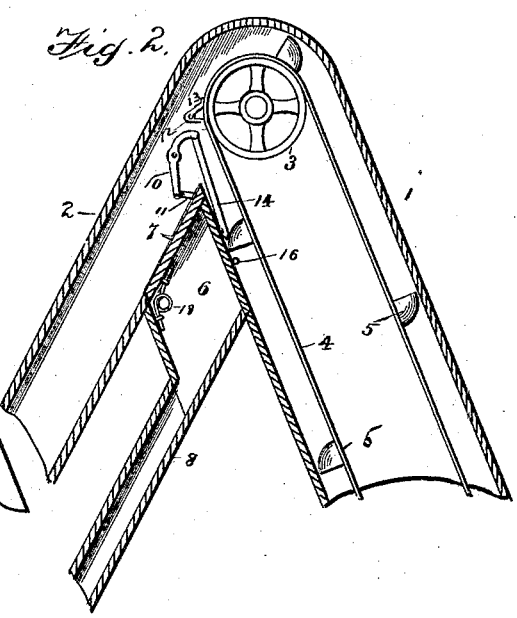
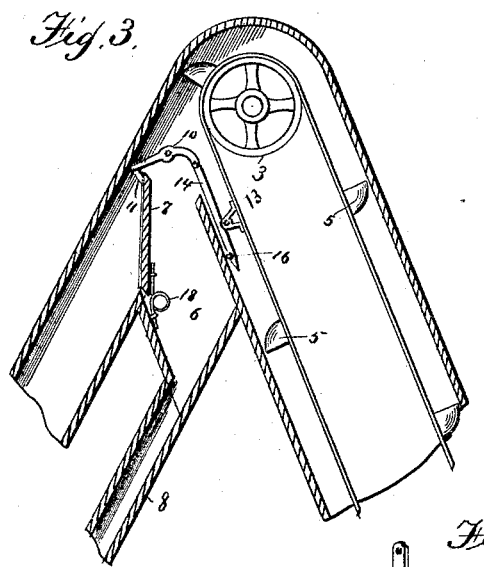
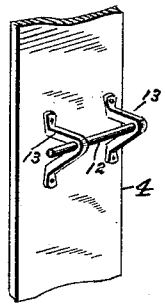
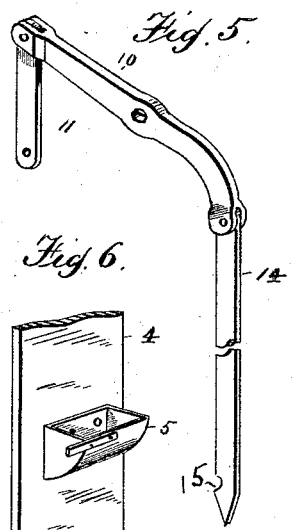
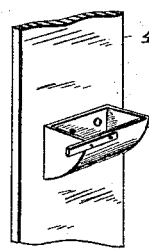
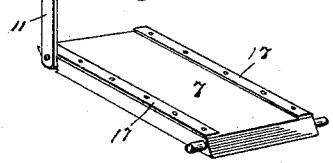
Witnesses
Thomas Durant
Alex J. Stewart
Inventor
Thomas M. Nesbitt
By his Attorney
W. N. H. Knight

UNITED STATES PATENT OFFICE.

THOMAS M. NESBITT, OF NESBITT, SOUTH CAROLINA.

GRAIN-TOLLER.

SPECIFICATION forming part of Letters Patent No. 413,084, dated October 15, 1889.

Application filed March 13, 1889. Serial No. 303,125. (No model.)

*To all whom it may concern:*

Be it known that I, THOMAS M. NESBITT, a citizen of the United States, residing at Nesbitt, in the county of Spartanburg and State of South Carolina, have invented certain new and useful Improvements in Grain-Tollers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in automatic grain-tollers; and it consists, essentially, in the construction, arrangement, and combination of the several parts comprised therein for service, substantially as is hereinafter set forth, and illustrated in the accompanying drawings, wherein similar figures of reference denote similar parts.

In said drawings, Figure 1 shows in side elevation a portion of a grain-elevator provided with my improvement. Fig. 2 is a sectional view through the part shown in Fig. 1, showing the toller-chute closed against the admission of grain. Fig. 3 is a similar sectional view showing the toll-chute open for the admission of grain. Figs. 4, 5, and 7 represent detached detail views of parts of the mechanism shown in Figs. 2 and 3; and Fig. 6 illustrates a modification of parts of the mechanism shown in Figs. 2 to 4, inclusive.

In the present embodiment of my invention I have shown a portion of an elevator-shaft 1, having a chute 2, rotatable drum 3, and carrier-belt 4, provided with cups 5 for the reception of grain, all of which parts are constructed and coact in the usual well-known manner for the transmission of grain from point to point, and are shown for the purpose of fully illustrating the purpose and operation of my invention, which consists in an auxiliary casing 6, which is placed at the intersection of the elevator-casing 1 and chute 2, as shown, and is separated from the latter by a swinging flap or door 7, that ordinarily forms a portion of the lower side of said chute 2, and is opened at stated periods for the admission of grain, &c., to said auxiliary casing 6 by mechanism presently to be explained.

I preferably provide the casing 7 with a chute 8, which leads therefrom to any desired point—as, for instance, a grain-bin below—and I further provide said casing with a hinged side flap or door 9, preferably providing the latter with a lock, as shown, to secure the contents of said casing 6 against removal by unauthorized persons.

I operate the hinged flap 7 for the purpose of permitting grain to pass through the chute 2 or casing 6, as desired, in the following-described manner, viz: Within the chute 2, at the upper end and side wall thereof, I pivot a lever 10, one end of which is connected by a bar 11 with the forward side edge of the swinging flap 7, (see Figs. 2, 3, and 7,) and which projects at its opposite end into the path of the overhanging end of the rod 12, which is carried by brackets 13, secured to the belt 4, intermediate of any desired pair of cups 5 thereon. To said projecting end of the lever 10, I pivot a pendent arm 14, the lower end of which is notched at 15 to embrace a pin 16, which projects into the casing 1, for a purpose presently to be explained.

I provide the upper surface of the flap 7 at the side edges thereof with joint-tightening strips 17, preferably of rubber, to prevent the passage of material from the chute 2 to the casing 6 at other than the desired periods of time.

I provide that the flap 7 be normally maintained in closed position by a spring 18, which may be of the character herein shown or of other form, as desired.

The operation of my improvement is as follows: Assuming the toll to be one-tenth of the grain, &c., carried by the elevator, I so place the brackets 13 upon the belt 4 that the nine cups immediately preceding said brackets shall be emptied or discharged into the chute 2 upon the upper surface of the flap 7, which is now held by the spring 18 in closed position, (see Fig. 2,) after which the bar 12 of said brackets 13 impinges upon the outer end of the lever 10, pressing it downward, and thereby, through the link 11, raising the flap 7. As the outer end of the lever 10 descends, the pendent arm 14, carried thereby, will also descend until the notch 15 therein will embrace the pin 16, in which position it will be maintained by the downward passage of said bar 12, now in contact with the outer surface of said arm 14, (see Fig. 3,) during which time the flap 7 will remain in raised position, so that the cup 5, immediately following the brackets 13, will be discharged through the opening normally closed by said flap 7 and into the casing 6, after which time the withdrawal of the bar 12 from the arm 14 will release the notch 15 from the pin 16, whereupon the spring 18 will return the flap 7 to its normal closed position, to be again opened at the proper time, as will be readily understood.

If desired, the bar 12 may be secured to the outer surface of one of the cups 5, as shown in Fig. 6, and when in this position will insure the discharge of the next following cup into the casing 6 in manner hereinbefore described.

Having thus described my invention, I claim and desire to secure by Letters Patent—

1. An automatic toller for elevators, comprising a casing attached to the elevator-chute, a flap between said chute and casing, a bracket attached to the elevator-belt, and connections between said bracket and flap, whereby the latter will be opened by the passage of the former, substantially as described.

2. In a toller for elevators, a casing connected with the elevator-chute, a flap or door closing communication between said chute and casing, a pivoted lever connected with said flap or door, and a bracket connected to the elevator-belt to actuate said lever and its connected flap, substantially as described.

3. In a toller for elevators, a casing connected with the elevator-chute, a flap or door opening from said chute to said casing, a lever pivoted to said chute, a connection between one end of said lever and said flap or door, a pendent arm connected to the free end of said lever, and a bracket connected with the elevator-belt to contact with said lever and arm to actuate said flap or door, substantially as described.

4. The combination, with an elevator chute and belt, of a casing connected with said chute, a flap or door between said chute and casing, flexible strips connected to the opposite side edges of said flap or door to impinge against the sides of said chute, a pivoted lever connected with said flap or door, a bracket upon the elevator-belt to contact with said lever to raise said flap, and a spring connected with said flap to return the same to closed position, substantially as described.

In testimony whereof I affix my signature in presence of two witnesses.

THOMAS M. NESBITT.

Witnesses:
JOHN W. WOFFORD,
JAMES A. FOSTER.